(12) United States Patent
Yue et al.

(10) Patent No.: US 9,428,407 B2
(45) Date of Patent: Aug. 30, 2016

(54) METHOD FOR PREPARING ANTI-HARDENING GRANULOUS CERAMIC IRON-CARBON MICRO-ELECTROLYSIS FILLER BY USING INDUSTRIAL WASTE

(71) Applicant: SHANDONG UNIVERSITY, Jinan (CN)

(72) Inventors: Qinyan Yue, Jinan (CN); Deyi Huang, Jinan (CN); Baoyu Gao, Jinan (CN); Yuanyuan Sun, Jinan (CN); Xiaowei Zhang, Jinan (CN); Yuan Gao, Jinan (CN); Kaifang Fu, Jinan (CN); Jiaojiao Kong, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 14/786,746

(22) PCT Filed: Mar. 10, 2014

(86) PCT No.: PCT/CN2014/073104
§ 371 (c)(1),
(2) Date: Oct. 23, 2015

(87) PCT Pub. No.: WO2014/180183
PCT Pub. Date: Nov. 13, 2014

(65) Prior Publication Data
US 2016/0075571 A1    Mar. 17, 2016

(30) Foreign Application Priority Data

May 10, 2013 (CN) .......................... 2013 1 0173058

(51) Int. Cl.
C02F 1/461    (2006.01)
C02F 1/28    (2006.01)
C02F 3/08    (2006.01)

(52) U.S. Cl.
CPC ............ *C02F 1/46114* (2013.01); *C02F 1/288* (2013.01); *C02F 3/08* (2013.01); *C02F 2201/46195* (2013.01); *Y02W 10/15* (2015.05)

(58) Field of Classification Search
CPC .................. C02F 1/46114; C02F 2001/46133
See application file for complete search history.

*Primary Examiner* — Peter F Godenschwager
(74) *Attorney, Agent, or Firm* — CBM Patent Consulting, LLC

(57) ABSTRACT

A method for preparing un-hardened ceramic micro-electrolysis fillers by industrial solid wastes comprises: (1) Scrap iron, lignin, red mud and clay was completely mixed as mass ratio (4-5):(2-3):(1-3):3 and then made into pellets; (2) The dried pellets were sintered without oxygen. The production could be used in wastewater treatment, which could not only increase biodegradability but also decrease CODCr and toxicity in a short time.

5 Claims, 1 Drawing Sheet

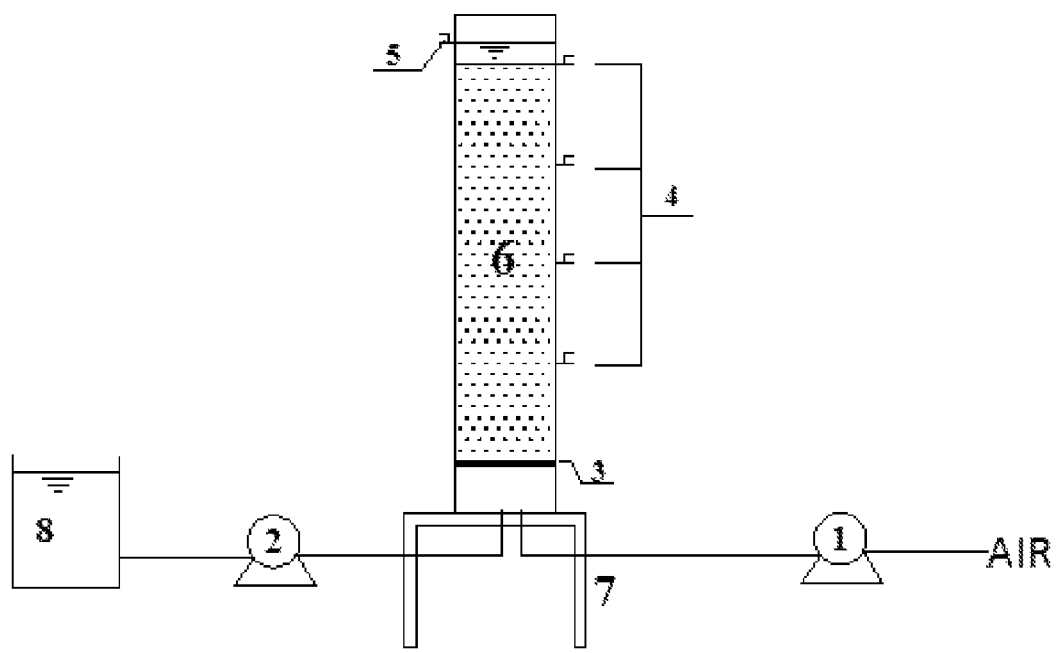

METHOD FOR PREPARING ANTI-HARDENING GRANULOUS CERAMIC IRON-CARBON MICRO-ELECTROLYSIS FILLER BY USING INDUSTRIAL WASTE

This application is the U.S. national phase of International Application No. PCT/CN2014/073104 filed on 10 Mar. 2014 which designated the U.S. and claims priority to Chinese Application No. CN201310173058.1 filed on 10 May 2013, the entire contents of each of which are hereby incorporated by reference.

BACKGROUND OF THE INVENTION

1. Field of the Invention

The present invention relates to a method to prepare un-hardened ceramic micro-electrolysis fillers by industrial solid wastes, which belongs to wastewater treatment field especially high-concentration refractory wastewater pretreatment field.

2. Description of the Related Art

Since 1960s, with the rapid development of chemical industry, a large number of synthetic organic materials were produced industrially, such as rubber, plastic, nylon, macromolecular, synthetic fiber and so on. During the production process of these organic materials, a large amount of high concentration organic wastewater was produced. According to Global Environment Statistics Bulletin, in China, 44.3% of total wastewater emission was industrial organic wastewater up to 2008 years. The components of the industrial organic wastewater is complicated which main contained aromatic compounds, heterocyclic compounds, sulfide, cyanide and heavy metal and so on. Even, some of the organics had strong carcinogenicity, mutagenicity toxicity and were difficult to be biodegraded which were extremely harmful to human health and environment. Traditional methods of treatment and pretreatment had high costs or lacked mature faultiness technological ways. Therefore, they could not be used widely.

In nature, the reserves of lignin was next to cellulose and 5 million tons lignin was regenerated annually. In pulping and papermaking industry, 140 million tons cellulose was separated from plants, and 50 million tons lignin was produced as by-product. But over 95% lignin was burned after condensation or discharged into rivers as black liquor. The reuse of lignin became the problem of people's attention. Scrap iron, a kind of common solid waste, was mainly generated from mechanical manufacturing industry and had a high production which not only occupied the valuable land resources but also polluted the environment. How to reuse the iron scrap were widely studied. Red mud was produced by aluminium industry which was harmful to environment. When 1 ton aluminium oxide was produced, 1-2 ton red mud was generated as by-product. As the fourth largest alumina production in the world, millions tons of red mud were discharged in China. Because pH of red mud lixivium was high which could reach 12-13, red mud belonged to hazardous waste. In China, red mud usually piled up in the past which not only occupied the land resources but also lead the soil, water and air pollution. Thus, treatment and recycling of red mud became the global environmental issues.

The micro-electrolysis technology, which is also called internal-electrolysis, is effective way to treat high concentration, high chroma, high salinity and refractory organic wastewater. When the micro-electrolysis fillers were soaked into wastewater, numerous macroscopic galvanic cells formed because of the potential difference between iron and carbon. In the galvanic cells, iron was anode and carbon was cathode. Contaminant was degraded in acid solution through electrochemical reaction. Micro-electrolysis technology was introduced into China in 1980s. And in recent years, it has been widely used in the wastewater treatment, such as printing and dyeing wastewater, pharmaceutical wastewater, pesticide wastewater and so on. In addition, micro-electrolysis technology had some advantages such as low cost, easy operation and maintenance. During the running of traditional micro-electrolysis process, the contact area between the sewage and the padding could be reduced due to the fillers hardening, which decreased the removal efficiency of wastewater and increased frequency of backwash and fillers replacement. This is the limit for micro-electrolysis technology to widely used. However, ceramic micro-electrolysis fillers had better performance on un-hardening than traditional fillers.

During productive process of traditional micro-electrolysis fillers, activated carbon or charcoal was added as cathode material. Activated carbon and charcoal were stable and did not generate gas, so the density of fillers was high. In addition, activated carbon and charcoal were produced by sintering. So it lead to energy waste to use activated carbon and charcoal sinter micro-electrolysis fillers.

SUMMARY OF THE INVENTION

The present invention which provide a method to prepare un-hardened ceramic micro-electrolysis fillers not only took advantage of industrial solid wastes such as scrap iron, lignin and red mud, but also improved the raw materials and production process of micro-electrolysis fillers to deal with the weakness of traditional technology.

The technical scheme of the present invention was as follows.

A method to prepare un-hardened ceramic micro-electrolysis fillers by industrial solid wastes, included the following steps:

(1) Pretreatment of raw materials. Scrap iron, lignin, red mud and clay were utilized to produce un-hardened ceramic micro-electrolysis fillers. All the raw materials were dried for 2-4 h at 105-110° C., and then crushed through 100 mesh sieves;

In the raw materials, scrap iron had Fe 90%-95%, lignin had cellulose 60%-70%, red mud came from Bayer process which included $SiO_2$ 18-20%, $Al_2O_3$ 12-15%, $Fe_2O_3$ 14-17%.

(2) Scrap iron, lignin, red mud and clay which were pretreated according step (1) was completely mixed as mass ratio (4-5):(2-3):(1-3):3, and then made into pellets as existing technology. The pellets which have a diameter of 5-6 mm were selected and then dried at room temperature for 20-24 h.

(3) Sintering in anoxic condition. The dried pellets were sintered at 300-400° C. for 10-15 min, and then sintered at 800-900° C. for 20-25 min without oxygen. The pellets were taken out when the temperature cooled down below 100° C. and then stored into sealed bags.

In step (3), the pellets must be cooled down below 100° C. in furnace anoxic condition to prevent oxidized in high temperature.

Preferably, according to the invention, in step (2), mass ratio of scrap iron, lignin, red mud and clay were selected as 4:2:3:3.

Preferably, according to the invention, in step (2), existing technology meant the mixture was made into pellets in a pelletizer and binder dilute solution was added during this step to assist pellets mold. The binder was prepared as existing technology. The preferred binder was prepared as polyvinyl alcohol 0.5 wt % and sodium carboxymethyl cellulose 1.5 wt % aqueous solutions thought boiling 30-60 min.

The stated binder dilute solution was prepared from the stated binder, which the stated binder was diluted 5-10 times by 80-100° C. water.

Preferably, according to the invention, in step (3), the dried pellets were sintered at 300° C. for 15 min, and then sintered at 800° C. for 25 min without oxygen. The pellets were taken out and stored into sealed bags when the temperature cooled down below 100° C.

Physical properties of un-hardened ceramic micro-electrolysis fillers which made as stated method were as follows: exterior was granulous, diameter was 4-6 mm, bulk density was 870-900 kg/m3, water absorption was 11%-14%.

The raw materials of the invention such as scrap iron, lignin, red mud were industry solid wastes or by-products which could be obtained from chemical market.

The un-hardened ceramic micro-electrolysis fillers which were prepared as the invention method could be used in the pretreatment of high-concentration refractory wastewater.

The beneficial effects of present invention were as follow:

1. The raw materials of micro-electrolysis fillers such as scrap iron, lignin and red mud were industrial solid wastes which are harmful to human health and ecosystem if they exposed in the environment for a long time. The invention which provided a method to prepare un-hardened ceramic micro-electrolysis fillers by industrial solid wastes not only saved clay resources but also achieved recycling of scrap iron, lignin and red mud. In addition, the micro-electrolysis fillers also could be used in high-concentration refractory wastewater treatment field to achieve treatment waste with waste.

2. During the preparation process of micro-electrolysis fillers, lignin was carbonized in high temperature without oxygen to form the anode instead of activated carbon or charcoal, therefore the activated carbon or charcoal resources were saved. Fillers sintering and lignin carbonization proceed simultaneously to increase energy efficiency. During carbonization of lignin, gas was produced to increase voidage and specific surface area and decrease the bulk density of micro-electrolysis fillers.

3. According the invention, the fillers were structured which decrease the contacting between fillers. The sintered surface structure of fillers could be destroyed in the wastewater treatment process. As the consumption of iron on the surface, the surface of fillers fell off and renewed. As a result, the hardening and service cycle of fillers were delayed and extended, respectively. In addition, iron and carbon were mixed evenly to keep the high treatment efficient.

4. The invention could be used in high-concentration refractory wastewater pretreatment and treatment field. Also, it had some advantages such as low production costs, easy operation and maintenance. Therefore, the present invention had a wide application prospect.

According to Fe/C galvanic cell reaction, macromolecular pollutants were destroyed into small molecules by redox, electro-deposition and coagulation, which could not only increase biodegradability but also decrease CODCr and toxicity in a short time. Therefore, the invention provided a method to treat high-concentration refractory wastewater. The invention used biomass (lignin) which could be carbonized in high temperature without oxygen as raw material to prepare micro-electrolysis fillers instead of activated carbon or charcoal.

BRIEF DESCRIPTION OF THE DRAWINGS

FIG. 1 showed a micro-electrolysis reactor which was filled with un-hardened ceramic micro-electrolysis fillers. In FIG. 1, (1) air pump, (2) peristaltic pump, (3) distribute water and air equally plate, (4) sample spots, (5) effluent spot, (6) micro-electrolysis fillers, (7) stainless steel stent, (8) water tank.

DETAILED DESCRIPTION OF THE PREFERRED EMBODIMENTS

The following is the detail description of the present invention with reference to examples, but the scope of the present invention is not limited thereto.

In the examples, scrap iron (iron 90%-95%) was obtained from Jinan Machinery Plant in Shandong Province. Red mud came from aluminium manufacturer which included $SiO_2$ 18-20%, $Al_2O_3$ 12-15%, $Fe_2O_3$ 14-17%. Lignin was taken from a paper mill of Shandong Province, China.

In the example, the binder was prepared as polyvinyl alcohol 0.5 wt % and sodium carboxymethyl cellulose 1.5 wt % aqueous solutions thought boiling 45 min. The binder dilute solution was prepared from the binder, which the binder was diluted 5-10 times by 80-100° C. water.

Example 1

Scrap iron, lignin, red mud and clay were completely mixed as mass ratio 40:20:30:30 in the mixer and then made into pellets in pelletizer. The binder dilute solution was added during this step to assist pellets mold. The pellets were sintered at 300° C. for 15 min, and then sintered at 800° C. for 25 min under the protection of nitrogen after they were dried at room temperature for 24 h. The pellets were taken out after temperature cooled down and then stored into sealed bags.

The properties of this micro-electrolysis were shown as follow: diameter was 4 mm, bulk density was 870 kg/m3, water absorption was 13%.

Example 2

Scrap iron, lignin, red mud and clay were completely mixed as mass ratio 45:25:25:30 in the mixer and then made into pellets in pelletizer. The binder dilute solution (same as example 1) was added during this step to assist pellets mold. The pellets were sintered at 350° C. for 20 min, and then sintered at 900° C. for 30 min under the protection of nitrogen after they were dried at room temperature for 24 h. The pellets were taken out after temperature cooled down and then stored into sealed bags.

The properties of this micro-electrolysis fillers were shown as follow: diameter was 5 mm, bulk density was 870 kg/m3, water absorption was 12%.

Example of Application

Two kinds of micro-electrolysis fillers which were made as example 1 and example 2 were filled into micro-electrolysis reactor which was shown in FIG. 1 to explore performance by wastewater treatment.

1. Acrylonitrile simulation wastewater (c=2000 mg/L) was treated by micro-electrolysis fillers which were made as example 1. Primarily, pH of influent was adjusted to 3 and then entered into reactor by peristaltic pump. When HRT was 8 h, COD of wastewater was reduced from 3000 mg/L to 1800 mg/L and removal efficiency of COD and acrylonitrile reached 40% and 70%, respectively. Cyanide anion was removed completely. The micro-electrolysis fillers did not harden and removal efficiency was stable when the micro-electrolysis reactor run 1 month continuously.

2. Acid red GR simulation wastewater (c=1000 mg/L) was treated by micro-electrolysis fillers which were made as example 2. In the conditions of influent pH of 3, A/L of 1.5, HRT of 6 h, removal efficiency of COD and chroma could reached 50% and 95%, respectively. When the reactor run 6 weeks successively, the removal efficiency was stable and the micro-electrolysis fillers did not harden.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for preparing un-hardened ceramic micro-electrolysis fillers by industrial solid wastes, included the following steps:
    (1) mix a scrap iron, a lignin, a red mud and a clay at mass ratio of (4-5):(2-3):(1-3):3 as a mixture, and dry the mixture for 2-4 h at 105-110° C., and then crush the mixture through 100 mesh sieves;
    wherein the scrap iron contains Fe 90%-95%, the lignin contains cellulose 60%-70%, the red mud prepared from Bayer process which contains $SiO_2$ 18-20%, $Al_2O_3$ 12-15%, $Fe_2O_3$ 14-17%;
    (2) make the pretreated mixture of scrap iron, lignin, red mud and clay in step (1) into pellets which have a diameter of 5-6 mm, and then dry the pellets at room temperature for 20-24 h;
    (3) sinter the dried pellets from step (2) at 300-400° C. for 10-15 min, and sinter at 800-900° C. for 20-25 min at the absence of oxygen, and cool down the temperature below 100° C., and then store in sealed bags.

2. The method according to claim 1, wherein in step (1), the mass ratio of scrap iron, lignin, red mud and clay is 4:2:3:3.

3. The method according to claim 1, wherein in step (2), add a pelletizer and binder dilute solution into the pellets to assist pellet mold, the binder is prepared with 0.5% of polyvinyl alcohol 0.5 wt % and 1.5% of sodium carboxymethyl cellulose in aqueous solution by weight by boiling 30-60 min, and then by diluting 5-10 times with 80-100° C. water.

4. The method according to claim 1, wherein in step (3), sinter the dried pellets at 300° C. for 15 min, and sinter at 800° C. for 25 min at the absence of oxygen, and then store in the sealed bags when the temperature cooled down to room temperature.

5. The method according to claim 1, wherein the physical properties of un-hardened ceramic micro-electrolysis fillers have granulous exterior, 4-6 mm of diameter, 870-900 kg/m3 of bulk density, and 11%-14% of water absorption.

* * * * *